United States Patent
Lu et al.

(10) Patent No.: US 12,155,258 B2
(45) Date of Patent: Nov. 26, 2024

(54) METHOD FOR CONTROLLING POWER SUPPLIES

(71) Applicants: Chih-Cherng Lu, Taoyuan (TW); Te-Lung Chen, Taoyuan (TW); Chia-Ching Ting, Taoyuan (TW); Shih-Hsun Hsu, Taoyuan (TW); Chen-Syuan Wong, Taoyuan (TW)

(72) Inventors: Chih-Cherng Lu, Taoyuan (TW); Te-Lung Chen, Taoyuan (TW); Chia-Ching Ting, Taoyuan (TW); Shih-Hsun Hsu, Taoyuan (TW); Chen-Syuan Wong, Taoyuan (TW)

(73) Assignee: Chroma ATE Inc., Taoyuan (TW)

( * ) Notice: Subject to any disclaimer, the term of this patent is extended or adjusted under 35 U.S.C. 154(b) by 534 days.

(21) Appl. No.: 17/565,506

(22) Filed: Dec. 30, 2021

(65) Prior Publication Data
US 2022/0209566 A1  Jun. 30, 2022

(30) Foreign Application Priority Data
Dec. 31, 2020 (TW) .................................. 109146992

(51) Int. Cl.
*H02J 7/00* (2006.01)
*G05B 23/02* (2006.01)

(52) U.S. Cl.
CPC .... *H02J 7/007188* (2020.01); *G05B 23/0256* (2013.01); *H02J 7/0013* (2013.01)

(58) Field of Classification Search
CPC .............. H02J 7/007188; H02J 7/0013; G05B 23/0256
See application file for complete search history.

(56) References Cited

FOREIGN PATENT DOCUMENTS

JP            4661343 B2 *   3/2011
JP         2018182848 A  *  11/2018

* cited by examiner

*Primary Examiner* — Michael W Choi

(57) ABSTRACT

The present invention provides a method for controlling M power supplies connected in series. The method comprises the following steps. Sending a test signal by a master power supply. Recording a first delay time when the test signal is received by the $1^{st}$ power supply and a second delay time when the test signal is received by the $M^{th}$ power supply. Selecting a maximum delay time from the first delay time and the second delay time. Calculating a difference time between the first delay time and the second delay time. When the maximum delay time is the first delay time, the master power supply waits for the first delay time to execute the first command after receiving the first command. The 1st power supply directly executes the first command after receiving it. The $M^{th}$ power supply waits for the difference time to execute the first command after receiving it.

8 Claims, 4 Drawing Sheets

METHOD FOR CONTROLLING POWER SUPPLIES

CROSS REFERENCE TO RELATED APPLICATION

The present application claims priority to Taiwan patent application Serial No. 109146992 filed on Dec. 31, 2020, the entire content of which is incorporated by reference to this application.

BACKGROUND OF THE INVENTION

1. Field of the Invention

The present invention pertains to a method for controlling power supplies, more specifically to a method for controlling power supplies to execute a command synchronously.

2. Description of the Prior Art

While testing an electronic product, a power supply is usually used to detect the voltage and current characteristics of the electronic product. Generally speaking, using one power supply is enough to handle the testing of small electronic products. However, for some large electronic products (such as DC/AC electronic loads, recycling AC loads, DC/AC power supplies) or battery equipment, because the required testing current may be large, one power supply might not be able to provide such testing current. It is necessary to use multiple power supplies to test, for example, the battery equipment at the same time. In other words, a very large number of power supplies are required to perform the testing of large electronic products in batches.

In one example, multiple power supplies may be connected in series, and one of the power supplies in the same string may be set as the master power supply. Next, instead of setting the power supplies one by one, the master power supply can transmit various commands to other power supplies in the same string. For example, the master power supply can command all power supplies to output a specific voltage (such as a sine wave voltage). However, because each of the power supplies in the same string may receive the command at different times, it is difficult to provide the specific sine wave by all power supplies at the same time. Person having ordinary skill in the art can understand that the unsynchronized sine wave voltage will cause serious waveform distortion and may cause flaws in the test. In practice, in order to solve the problem of outputting the specific voltage by all power supplies synchronously, many external computers may be used for synchronous control, or several high-cost buses may be used to speed up the communication. Accordingly, the industry needs a new method for controlling power supplies, so that all power supplies can execute commands synchronously without adding additional equipment.

SUMMARY OF THE INVENTION

The present invention provides a method for controlling power supplies, and each power supply can store its delay time for executing commands. Therefore, after the power supplies in different locations receives the command, the power supplies only need to wait for its delay time before executing the command, and all the power supplies can execute the command synchronously.

The present invention provides a method for controlling power supplies, for controlling M power supplies connected in series with the $n^{th}$ power supply as a master power supply, comprises: sending a test signal by the master power supply; recording a first delay time corresponding to the test signal received by the $1^{st}$ power supply and a second delay time corresponding to the test signal received by the $M^{th}$ power supply; selecting a maximum delay time from the first delay time and the second delay time; and calculating a difference time between the first delay time and the second delay time. Wherein when the maximum delay time is the first delay time, the master power supply waits for the first delay time to execute a first command after receiving the first command, the $1^{st}$ power supply directly executes the first command after receiving the first command; and the $M^{th}$ power supply waits for the difference time to execute the first command after receiving the first command. Wherein when the maximum delay time is the second delay time, the master power supply waits for the second delay time to execute a second command after receiving the second command, the $1^{st}$ power supply waits for the difference time to execute the second command after receiving the second command; and the $M^{th}$ power supply directly executes the second command after receiving the second command. Wherein M is a natural number greater than 2, and n is a natural number not greater than M.

In some embodiments, the method for controlling power supplies may further comprise: recording a first time difference between the test signal received by the $i^{th}$ power supply and the $1^{st}$ power supply when i is less than n; and recording a second time difference between the test signal received by the $i^{th}$ power supply and the $M^{th}$ power supply when i is greater than n but not greater than M. Wherein i is a natural number between i and M. The $i^{th}$ power supply waits for the first delay time to execute the first command after receiving the first command when the maximum delay time is the first delay time and i is less than n. The $i^{th}$ power supply waits for the second delay time to execute the first command after receiving the first command when the maximum delay time is the first delay time and i is greater than n but not greater than M. The $i^{th}$ power supply waits for the first delay time to execute the second command after receiving the second command when the maximum delay time is the second delay time and i is less than n. The $i^{th}$ power supply waits for the second delay time to execute the second command after receiving the second command when the maximum delay time is the second delay time and i is greater than n but not greater than M.

In some embodiments, wherein each of the M power supplies has a first terminal and a second terminal, the first terminal of the $j^{th}$ power supply is connected to the second terminal of the $j-1^{th}$ power supply, and the method may further comprise: performing an inspection procedure by each of the M power supplies to identify whether the first terminal and the second terminal being connected. When the inspection procedure recognizes that the first terminal is connected and the second terminal is not connected, set a first connection status code. When the inspection procedure recognizes that the first terminal and the second terminal are both connected, set a second connection status code. When the inspection procedure recognizes that the second terminal is connected and the first terminal is not connected, set a third connection status code. Wherein j is a natural number greater than 2 and less than M.

In some embodiments, the method for controlling power supplies may further comprise: determining that the master power supply has the first connection status code, the second connection status code, or the third connection status code. When the master power supply has the first connection status code, only the first terminal of the master power supply transmits the test signal. When the master power supply has the second connection status code, both of the first terminal and the second terminal of the master power supply transmit the test signal simultaneously. When the master power supply has the third connection status code, only the second terminal of the master power supply transmits the test signal.

In summary, the method for controlling power supplies provided by the present invention can set the master power supply in a series of power supplies, and record the delay time of executing commands of the power supply located before and after the master power supply. When the master power supply issues a command, each power supply only needs to wait for its delay time so that all power supplies can execute the command synchronously.

BRIEF DESCRIPTION OF THE APPENDED DRAWINGS

DETAILED DESCRIPTION OF THE INVENTION

The features, objectives, and functions of the present invention are further disclosed below. However, it is only a few of the possible embodiments of the present invention, and the scope of the present invention is not limited thereto; that is, the equivalent changes and modifications done in accordance with the claims of the present invention will remain the subject of the present invention. Without departing from the spirit and scope of the invention, it should be considered as further enablement of the invention.

Figure 1:
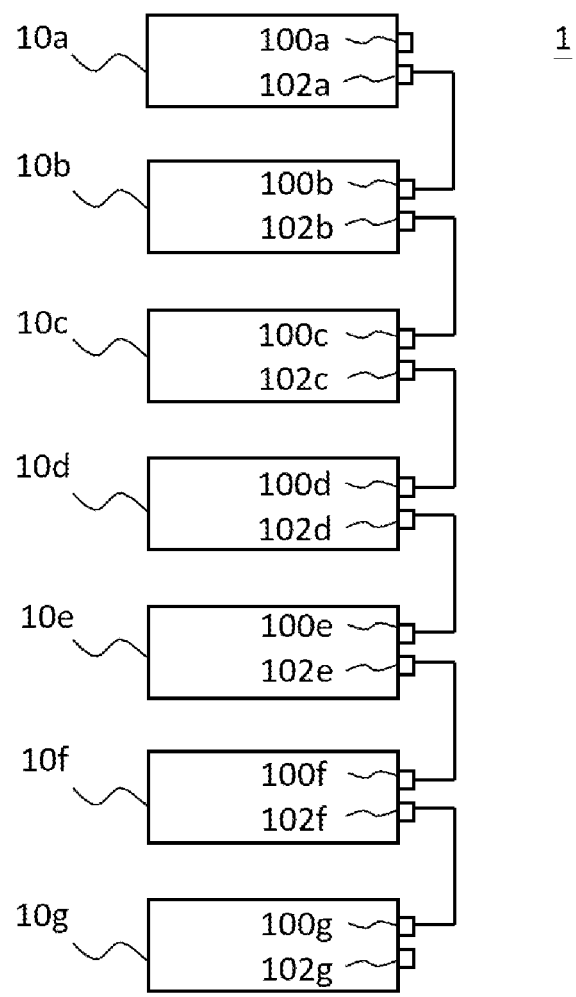
FIG. 1 is a block diagram of a power supply system in accordance with an embodiment of the present invention.

In order to demonstrate the method for controlling power supplies of the present invention, please refer to FIG. 1, FIG. 1 is a block diagram of a power supply system in accordance with an embodiment of the present invention. The power supply system 1 can apply the method for controlling power supplies of the present invention. As shown in FIG. 1, the power supply system 1 may have multiple power supplies 10a-10g, each power supply has a first terminal and a second terminal, and the first terminal of the previous power supply is connected to the second terminal of the next power supply. In practice, the first terminal of the previous power supply and the second terminal of the next power supply can be connected via a communication wire. Because a plurality of power supplies 10a-10g are stacked together, for example, the communication wire does not need to be too long. For example, the communication wire may be, for example, an HDMI cable with a length of 1 meter. In addition, this embodiment does not limit that the plurality of power supplies 10a-10g have to communicate only through the communication wire. In practice, each power supply may also have other ports connected to a common bus.

It can be seen from FIG. 1 that the plurality of power supplies 10a-10g are connected in series forming a power supply string. In this embodiment, it is assumed that the first power supply in the power supply string is the power supply 10a, and the last power supply in the power supply string is the power supply 10g. The power supplies 10b to 10f are the power supplies in the middle of the power supply string. Since the power supply 10a is already the first power supply, it can be seen that the first terminal 100a of the power supply 10a is not connected to any power supply, and only the second terminal 102a is connected to the first terminal 100b of the next power supply 10b. In contrast, since the power supply 10g is already the last power supply, it can be seen that the second terminal 102g of the power supply 10g is not connected to other power supplies, and only the first terminal 100g is connected to the second terminal 102f of the previous power supply 10f. Take the power supply 10c as an example for the power supply in the middle of the power supply string. The first terminal 100c of the power supply 10c can be connected to the second terminal 102b of the power supply 10b, and the second terminal 102c of the power supply 10c can also be connected to the first terminal 100d of the power supply 10d. Thereby, a series configuration in which the first terminal of the previous power supply and the second terminal of the next power supply are connected to each other is formed.

Although FIG. 1 shows 7 power supplies, the present embodiment does not limit the number of power supplies. Of course, person having ordinary skill in the art can selectively increase or decrease the number of power supplies. In practice, the power supplies 10a-10g can be stacked, and then connected to each other in order using communication wires, so that the physical locations of the power supplies 10a-10g can correspond to the order in the power supply string. Then, one of the power supplies 10a-10g can be set as the master power supply through an external computer. For example, it is also possible to press a button on one of the power supplies 10a-10g, thereby setting the power supply whose button is pressed as the master power supply. For the convenience of description, in this embodiment, the power supply 10c is set as the master power supply. It can be seen from FIG. 1, the power supplies 10a-10b are the power supplies arranged before the power supply 10c, and the power supplies 10d-10g are the power supplies arranged after the power supply 10c. In one example, each of the power supply 10a-10g can record its position in the power supply string, the power supply 10a can know that it is the first power supply, so the first terminal 100a is not connected and only the second terminal 102a is connected. For example, the power supply 10g can know that it is the last power supply, so the second terminal 102g is not connected and only the first terminal 100g is connected. Besides, the power supply 10c may know that it is in the middle of the power supply string, so both the first terminal 100c and the second terminal 102c are connected to other power supplies.

Figure 2:
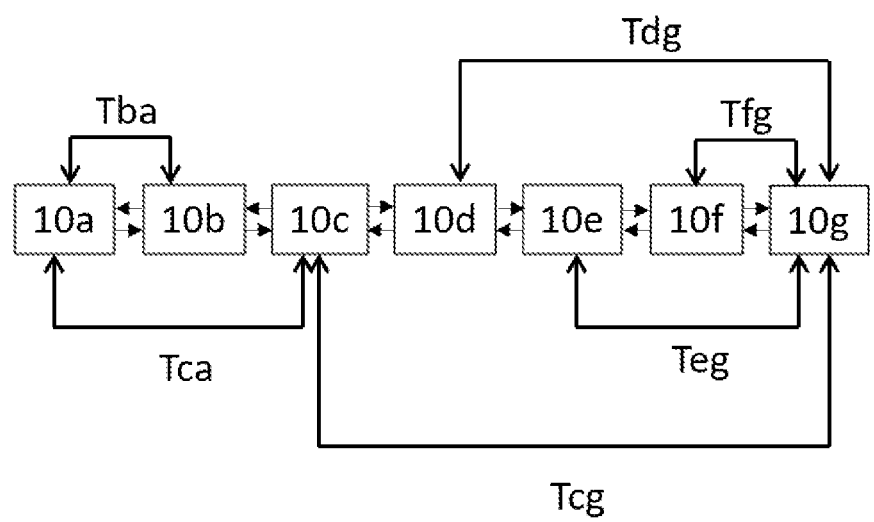
FIG. 2 is a schematic diagram showing the delay time of the power supply system according to an embodiment of the present invention.

In order to explain the delay time when each of the power supply 10a-10g receives the signal, please refer to FIG. 1 and FIG. 2 together. FIG. 2 is a schematic diagram showing the delay time of the power supply system according to an embodiment of the present invention. As shown in FIG. 2, since the power supply 10c is set as the master power supply, in order to determine the respective delay times of the power supplies 10a-10g, the power supply 10c will send a test signal in the first place. At this time, because the power supply 10c is a power supply in the middle of the power supply string, the first terminal 100c and the second terminal 102c are connected to other power supplies, so the test signal will be sent from both of the first terminal 100c and the second terminal 102c simultaneously. Of course, if the power supply 10a is used as the master power supply, only the second terminal 102a will send out the test signal. Back to the example that the power supply 10c is set as the master power supply, the test signal from the first terminal 100c will enter the power supply 10b from the second terminal 102b. After the power supply 10b receives the test signal, it will pass the test signal from the first terminal 100b to the second terminal 102a of the power supply 10a. Since the first terminal 100a of the power supply 10a is no longer connected to any power supply, the power supply 10a sends a feedback signal back to the first terminal 100b of the power supply 10b. The feedback signal here can be the same as the test signal, which is not limited in this embodiment.

Person having ordinary skill in the art can understand that because the back and forth signal transmission paths (between the power supplies 10c-10a) are the same, the time interval between the power supply 10b receiving the feedback signal and the test signal is twice the time of the test signal transmitted from the power supply 10b to the power supply 10a. In this embodiment, the time of the test signal starts from the power supply 10b and arrives at the power supply 10a is called the first time difference Tba. In other words, because the power supply 10b can record the time interval 2 Tba between the test signal is received and the feedback signal is received, the first time difference Tba can easily be obtained by dividing the time interval 2 Tba by two without complicated calculation.

Similarly, the power supply 10b will also return the feedback signal from the second terminal 102b to the first terminal 100c of the power supply 10c. The power supply 10c can record the time interval 2 Tca between receiving the feedback signal from the power supply 10a and sending the test signal by itself, which is equal to twice the one-way time that signals transmitted from the power supply 10c to the power supply 10a. For the convenience of description, this embodiment defines the time of a signals starts from the master power supply (power supply 10c) and reaches the last power supply (power supply 10a) as a first delay time Tca. In this way, the first delay time Tca can express the time delay for the farthest power supply arranged before the power supply 10c to receive the test signal.

For the power supplies arranged after the power supply 10c, the test signal from the second terminal 102c enters the power supply 10d from the first terminal 100d. After the power supply 10d receives the test signal, it transmits the test signal from the second terminal 102d to the first terminal 100e of the power supply 10e. Similarly, the power supply 10e and the power supply 10f are both power supplies in the middle of the power supply string. The test signal can be transmitted from the power supply 10d, the power supply 10e, and the power supply 10f to the power supply 10g in sequence. Since the second terminal 102g of the power supply 10g is no longer connected to any power supply, the power supply 10g knows that it is the last power supply, so it will return the feedback signal back to the second terminal 102f of the power supply 10f. And, the feedback signal passes the power supply 10e and the power supply 10d in sequence, and finally returns to the power supply 10c. Since the back and forth signal transmission paths (between the power supplies 10c-10g) are the same, the time interval between the power supply 10f receiving the feedback signal and the test signal is twice the one-way time from the power supply 10f to the power supply 10g. In this embodiment, the one-way time that the test signal starts from the power supply 10f and reaches the power supply 10g is called the second time difference Tfg. Similarly, the second time differences Teg and Tdg can also be calculated.

In one example, the power supply 10c can record the time interval 2 Tcg between receiving the feedback signal from the power supply 10g and sending the test signal by itself, which is equal to twice the one-way time that signals transmitted from the power supply 10c to the power supply 10g. For the convenience of description, this embodiment defines the time of a signal starts from the master power supply (power supply 10c) and reaches the last power supply (power supply 10g) as a second delay time Tcg. In this way, the second delay time Tcg can express the time delay for the farthest power supply arranged after the power supply 10c to receive the test signal.

After the master power supply (power supply 10c) receives the first delay time Tca and the second delay time Tcg, it will compare the first delay time Tca and the second delay time Tcg, so as to select a maximum delay time. In practice, the first delay time Tca is positively related to the number of power supplies connected before the master power supply, and the second delay time Tcg is positively related to the number of power supplies connected after the master power supply. Assume that the same communication wires are used between every two adjacent power supplies that means the transmission lengths between every two adjacent power supplies can be the same. Theoretically, more power supplies are connected in the power supply string might require more pieces of communication wires, the longer the total length of the communication wires, the longer the transmission time will be, that is, the longer the delay time will be. Taking FIG. 1 as an example, the power supply system 1 has two power supplies before the master power supply, and has four power supplies after the master power supply, the second delay time Tcg should be the maximum delay time.

From a physics point of view, the first delay time Tca is the time required for the power supply 10c to transmit a signal to the farthest power supply connected before the power supply 10c, and the second delay time Tcgs is the time required for the power supply 10c to transmit a signal to the farthest power supply connected after the power supply 10c. Here, the master power supply (power supply 10c) calculates the difference between the first delay time Tca and the second delay time Tcg, which is defined as a difference time Tdiff in this embodiment. In one example, in this embodiment, the difference time Tdiff refers to a pure value, that is, the absolute value of the difference between the first delay time Tca and the second delay time Tcg. For example, since the second delay time Tcg is greater, the second delay time Tcg should be equal to the sum of the first delay time Tca and the difference time Tdiff. Conversely, if the first delay time Tca is greater, the first delay time Tca will be equal to the sum of the second delay time Tcg and the difference time Tdiff.

Figure 3:
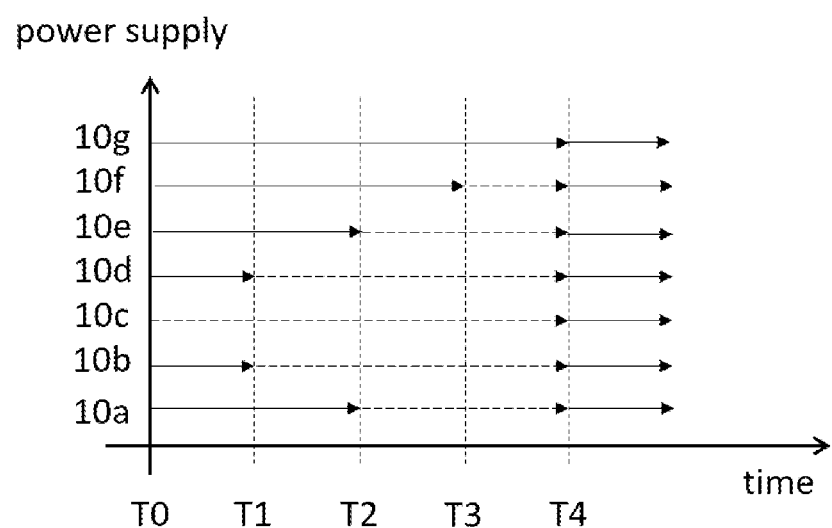
FIG. 3 is a schematic diagram showing a command executed by the power supply system according to an embodiment of the present invention.

Subsequently, the master power supply (power supply 10c) can send the corresponding delay time corresponding to each power supply. For example, because the number of power supplies connected after the master power supply is greater, when the master power supply sends a command at the same time, the power supply 10a should receive the command before the power supply 10g. However, if the power supply 10a directly executes the command after receiving the command, there will be no way to synchronize with the power supply 10g (because the power supply 10g has not received the command). Therefore, please refer to FIG. 2 and FIG. 3 together. FIG. 3 is a schematic diagram showing a command executed by the power supply system according to an embodiment of the present invention. As shown in the figures, suppose that the power supply 10*c* synchronously sends a command to the power supply 10*b* and the power supply 10*d* from the first terminal 100*c* and the second terminal 102*c* at the time T0. Assuming that the signal is transmitted to any two adjacent power supplies at the same time, it can be known that the power supply 10*b* and the power supply 10*d* will receive the command at time T1 and continue to send the command to the next power supply (the power supply 10*a* and the power supply 10*e*), respectively. At time T2, the power supply 10*a* and the power supply 10*e* should receive the command, but because the power supply 10*a* is not connected to any power supply, only the power supply 10*e* continues to send the command to the power supply 10*f*. At time T3, after the power supply 10*f* receives the command, the power supply 10*f* continues to send the command to the power supply 10*g*. Finally, at time T4, the power supply 10*g* will receive the command.

As shown in FIG. 3, the purpose of this embodiment is to enable all power supplies 10*a*-10*g* to execute the command synchronously. For example, after the last power supply 10*g* at time T4 receives the command, the power supplies 10*a*-10*g* might be able to execute the command synchronously. Accordingly, the power supplies that received the command before time T4 need to wait until the time T4, as the dotted lines in FIG. 3. Because time T0 to time T2 is the first delay time Tca, and time T0 to time T4 is the second delay time Tcg. In view of the power supplies connected before the power supply 10*c*, the power supply 10*a* waits for the difference time Tdiff (the difference between the first delay time Tca and the second delay time Tcg) to execute the command after receiving the command at time T2, that is, the power supply 10*a* can execute the command synchronously at time T4, and the command may be, for example, controlling the power supply to output a specific voltage. In addition, after the power supply 10*b* receives the command at time T1, the power supply 10*b* waits for the first time difference Tba to the time T2 until the power supply 10*a* receives the command. And then, the power supply 10*b* further waits for the difference time Tdiff to execute the command, that is, the command can be executed synchronously at the time T4. For the power supply 10*c*, because the power supply 10*c* is the master power supply, it needs to wait until the last power supply receives the command to execute the command synchronously. In this embodiment, because the power supply 10*g* is the last power supply to receive the command, and the second delay time Tcg is the maximum delay time, the power supply 10*c* needs to wait for the second delay time Tcg to time T4 before executing the command.

In view of the power supplies connected after the power supply 10*c*, the power supply 10*d* waits for the second time difference Tdg after receiving the command at time T1 until the power supply 10*g* receives the command at the time T4. Person having ordinary skill in the art can understand that since the time T4 is the time that the last power supply (the power supply 10*g*) receives the command, the power supply 10*d*, therefore, can directly execute the command after waiting for the second time difference Tdg. Similarly, the power supply 10*e* should wait for the second time difference Teg after receiving the command at time T2, and the power supply 10*f* also should wait for the second time difference Tfg after receiving the command at time T3 until the power supply 10*g* receives the command at the time T4. Finally, because the power supply 10*g* is the last power supply to receive the command, the power supply 10*g* can directly execute the command after receiving the command at time T4, so that the power supplies 10*a*-10*g* can execute the command synchronously.

Of course, the foregoing embodiment presets that each power supply knows its position in the power supply string. In practice, multiple power supplies may have just been arranged, and each power supply is not sure whether there is any power supply connected at terminals. After the power supplies 10*a*-10*g* are connected, a command to execute the inspection procedure can be send to the power supply 10*a*-10*g* through an external computer. For example, the external computer can send a command to execute the inspection procedure through a bus connected to all power supplies 10*a*-10*g*. The inspection procedure can also be started by user individually pressing buttons on the power supplies 10*a*-10*g*. In addition, in the inspection procedure, each power supply can check whether its first terminal and its second terminal are correctly connected.

For example, after the inspection procedure, the power supply 10*a* can know that the first terminal 100*a* is not connected, and only the second terminal 102*a* is connected. At this time, the power supply 10*a* can store the inspection result as a connection status code, it can be, for example, recorded as 01 (the third connection status code). Similarly, the power supply 10*g* can know that the second terminal 102*g* is not connected, and only the first terminal 100*g* is connected. At this time, the power supply 10*g* can store the inspection result as the connection status code, it can be, for example, recorded as 10 (the first connection status code). On the other hand, for the power supply in the middle of the power supply string, the power supply 10*c* is taken as an example, and the first terminal 100*c* and the second terminal 102*c* are both connected. At this time, the power supply 10*c* can store the inspection result as the connection status code, it can be, for example, recorded as 11 (the second connection status code).

Since the first terminal 100*c* and the second terminal 102*c* of the power supply 10*c* are both connected and have the second connection status code, the power supply 10*c* can send the test signal and the commands from both the first terminal 100*c* and the second terminal 102*c* synchronously when the power supply 10*c* is set as the master power supply 102*c*. In addition, if the power supply 10*a* is set as the master power supply, because the connection status code of the power supply 10*a* is 01 (the third connection status code), it means that only the second terminal 102*a* is connected, so that the power supply 10*a* only needs to send the test signal and the commands from the second terminal 102*a*. Conversely, if the power supply 10*g* is set as the master power supply, because the connection status code of the power supply 10*g* is 10 (first connection status code), it means that only the first terminal 100*g* is connected, so that the power supply 10*a* only needs to send the test signal and the commands from the first terminal 100*g*.

Figure 4:
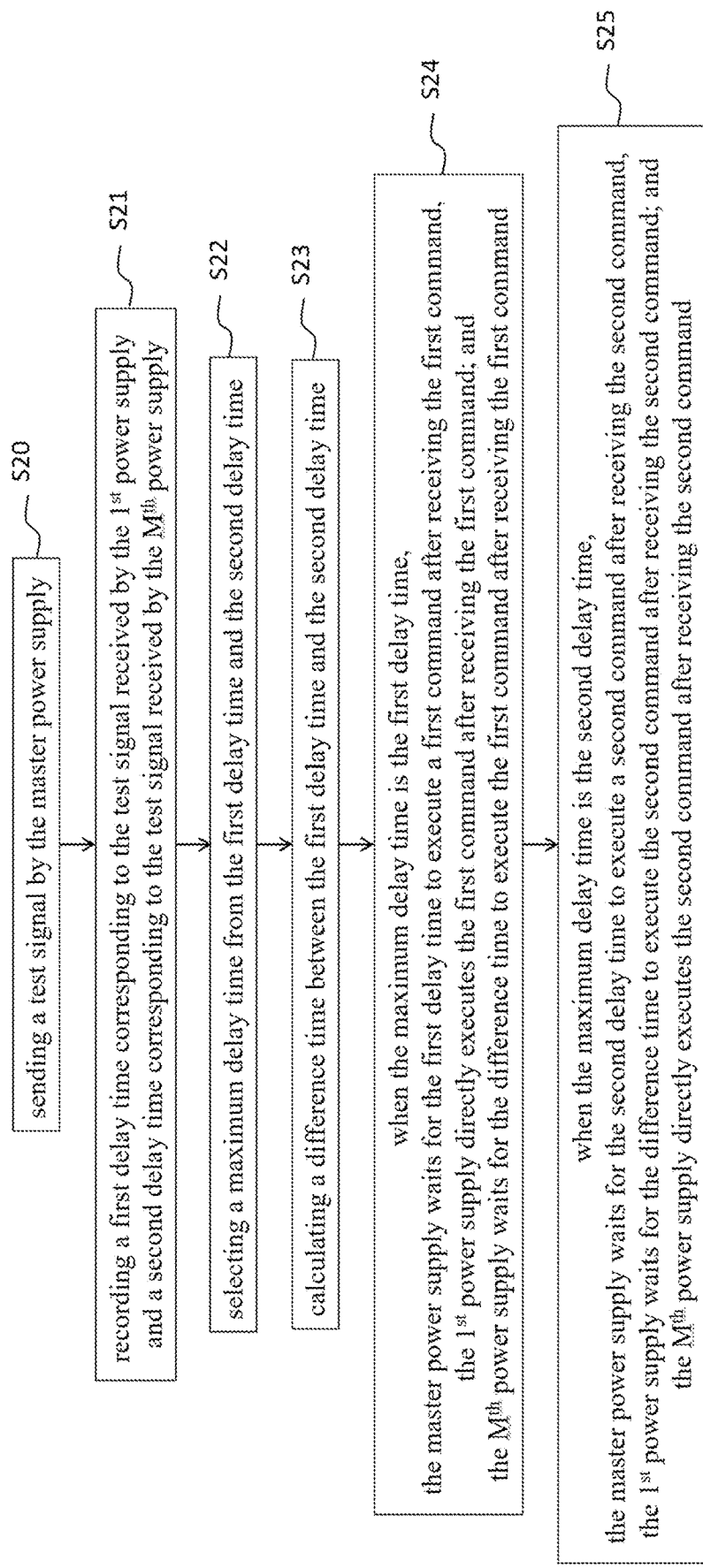
FIG. 4 is a flowchart of the method for controlling power supplies in accordance with an embodiment of the present invention.

The aforementioned embodiments use the power supply system 1 to explain the method for controlling power supplies provided by the present invention. Please refer to FIG. 1 and FIG. 4 together, FIG. 4 is a flowchart of the method for controlling power supplies in accordance with an embodiment of the present invention. As shown in the figures, in step S20, the power supply 10*c* will simultaneously send the test signal from the first terminal 100*c* and the second terminal 102*c*. In step S21, the master power supply (power supply 10*c*) can record the first delay time Tca according to the time interval between receiving the feedback signal from the power supply 10*a* and sending the test signal by itself. And, the master power supply can also record the second delay time Tcg according to the time interval between receiving the feedback signal from the power supply 10g and sending the test signal by itself. In step S22, the master power supply compares the first delay time Tca and the second delay time Tcg, and selects the greater one as the maximum delay time. In step S23, the master power supply calculates the difference between the first delay time Tca and the second delay time Tcg, and the difference can be defined as the difference time Tdiff.

In step S24, contrary to the example shown in FIG. 1, another possibility is described here. That is, if there are more power supplies connected before the master power supply, the maximum delay time will be the first delay time. At this time, after receiving the command, the master power supply waits for the last power supply to receive the command (that is, the first delay time) and executes the command. The first power supply in the power supply string can directly execute the command after receiving the command, and the last power supply in the power supply string waits for the difference time to execute the command after receiving the command. In step S25, similar to the example shown in FIG. 1, if the number of power supplies connected after the main control power supply is greater, the maximum delay time will be the second delay time. At this time, as in the foregoing embodiment, the master power supply (power supply 10c) receives the command and waits for the second delay time Tcg to execute the command, and the first power supply (power supply 10a) waits for the difference time Tdiff to execute the command after receiving the command, the last power supply (power supply 10g) directly executes the command after receiving the command. As for the other steps of the method, they have been fully described in the foregoing embodiment, and will not be repeated here.

In summary, the method for controlling power supplies provided by the present invention can set the master power supply in a series of power supplies, and record the delay time of executing commands of the power supply located before and after the master power supply. When the master power supply issues a command, each power supply only needs to wait for its delay time so that all power supplies can execute the command synchronously.

What is claimed is:

1. A method for controlling power supplies, for controlling M power supplies connected in series with the $n^{th}$ power supply as a master power supply, comprising:
   sending a test signal by the master power supply;
   recording a first delay time corresponding to the test signal received by the $1^{st}$ power supply and a second delay time corresponding to the test signal received by the $M^{th}$ power supply;
   selecting a maximum delay time from the first delay time and the second delay time; and
   calculating a difference time between the first delay time and the second delay time;
   wherein when the maximum delay time is the first delay time, the master power supply waits for the first delay time to execute a first command after receiving the first command, the $1^{st}$ power supply directly executes the first command after receiving the first command; and the $M^{th}$ power supply waits for the difference time to execute the first command after receiving the first command;
   wherein when the maximum delay time is the second delay time, the master power supply waits for the second delay time to execute a second command after receiving the second command, the $1^{st}$ power supply waits for the difference time to execute the second command after receiving the second command; and the $M^{th}$ power supply directly executes the second command after receiving the second command;
   wherein M is a natural number greater than 2, and n is a natural number not greater than M.

2. The method for controlling power supplies according to claim 1, further comprising:
   recording a first time difference between the test signal received by the $i^{th}$ power supply and the $1^{st}$ power supply when i is less than n; and
   recording a second time difference between the test signal received by the $i^{th}$ power supply and the $M^{th}$ power supply when i is greater than n but not greater than M;
   wherein i is a natural number between 1 and M.

3. The method for controlling power supplies according to claim 2, wherein the $i^{th}$ power supply waits for the first delay time to execute the first command after receiving the first command when the maximum delay time is the first delay time and i is less than n.

4. The method for controlling power supplies according to claim 2, wherein the $i^{th}$ power supply waits for the second delay time to execute the first command after receiving the first command when the maximum delay time is the first delay time and i is greater than n but not greater than M.

5. The method for controlling power supplies according to claim 2, wherein the $i^{th}$ power supply waits for the first delay time to execute the second command after receiving the second command when the maximum delay time is the second delay time and i is less than n.

6. The method for controlling power supplies according to claim 2, wherein the $i^{th}$ power supply waits for the second delay time to execute the second command after receiving the second command when the maximum delay time is the second delay time and i is greater than n but not greater than M.

7. The method for controlling power supplies according to claim 2, wherein each of the M power supplies has a first terminal and a second terminal, the first terminal of the $j^{th}$ power supply is connected to the second terminal of the $j-1^{th}$ power supply, and the method further comprising:
   performing an inspection procedure by each of the M power supplies to identify whether the first terminal and the second terminal being connected;
   wherein when the inspection procedure recognizes that the first terminal is connected and the second terminal is not connected, set a first connection status code;
   wherein when the inspection procedure recognizes that the first terminal and the second terminal are both connected, set a second connection status code; and
   wherein when the inspection procedure recognizes that the second terminal is connected and the first terminal is not connected, set a third connection status code;
   wherein j is a natural number greater than 2 and less than M.

8. The method for controlling power supplies according to claim 7, further comprising:
   determining that the master power supply has the first connection status code, the second connection status code, or the third connection status code;
   wherein when the master power supply has the first connection status code, only the first terminal of the master power supply transmits the test signal;
   wherein when the master power supply has the second connection status code, both of the first terminal and the second terminal of the master power supply transmit the test signal simultaneously; and wherein when the master power supply has the third connection status code, only the second terminal of the master power supply transmits the test signal.

* * * * *